United States Patent [19]
Lassanske

[11] 3,948,110
[45] Apr. 6, 1976

[54] ENDLESS CLEATED TRACK

[75] Inventor: George G. Lassanske, Oconomowoc, Wis.

[73] Assignee: Outboard Marine Corporation, Waukegan, Ill.

[22] Filed: Oct. 18, 1974

[21] Appl. No.: 515,824

[52] U.S. Cl. .................................... 74/229; 305/39
[51] Int. Cl.² .......................................... F16H 7/00
[58] Field of Search .................. 74/216.5, 225, 229; 180/9.2 R; 305/53, 57, 39

[56] References Cited
UNITED STATES PATENTS

| 335,187 | 2/1886 | Gingras | 74/231 J |
|---|---|---|---|
| 2,992,862 | 7/1961 | Fredricks et al. | 305/57 X |
| 3,472,563 | 10/1969 | Irgens | 74/229 X |
| 3,483,766 | 12/1969 | Erickson | 305/57 |
| 3,853,016 | 12/1974 | Lane et al. | 74/229 |

*Primary Examiner*—John J. Camby
*Attorney, Agent, or Firm*—Michael, Best & Friedrich

[57] ABSTRACT

Disclosed herein is an endless track assembly including three endless belts formed from a flexible material and supported for movement in parallel spaced relation by a plurality of spaced and transversely extending traction bars or cleats. Only the center belt, which preferably is a one-piece unit, includes at least one row of longitudinally spaced teeth which project from the inner surface thereof. The outer two belts preferably are of a spliced construction. The track assembly is driven by a drive sprocket including axially extending lugs which drivingly engage the teeth on the center belt.

13 Claims, 6 Drawing Figures

ENDLESS CLEATED TRACK

BACKGROUND OF THE INVENTION

This invention relates to endless, cleated track assemblies for tracked vehicles.

Various prior constructions have been used for endless track assemblies to provide traction for tracked vehicles such as snowmobiles, tractors, and the like. These prior constructions generally fall into three categories. In a first construction, the track assembly includes the plurality of flexible endless belts of spliced construction and interconnected for movement in a parallel spaced relation by a plurality of uniformly spaced, transverse traction bars or cleats mounted on the outer surfaces of the belts. The track assembly is driven by one or more drive sprockets including radial teeth which extend through the spacing between adjacent belts and sequentially engage the traction bars or cleats.

In a second construction, the track assembly includes a number of one-piece endless belts which are interconnected for movement in parallel spaced relation by transverse traction bars or cleats and are driven in the same manner as the first construction.

In a third construction, the track assembly includes two or more one-piece, endless belts which are interconnected for movement in parallel spaced relation by transverse traction bars or cleats, each belt having integrally molded drive teeth on the inner surface and being driven by a drive sprocket having drive lugs or tangs which drivingly engage the drive teeth.

It is generally recognized that the fabrication costs for the second and third constructions are somewhat higher than for the first construction, with the third construction being the most expensive. On the other hand, it is also recognized that the mechanical efficiency of the third construction is superior to that for either the first or second constructions, particularly at higher speeds, with the first construction being the least efficient.

SUMMARY OF THE INVENTION

The invention provides a low-cost, mechanically efficient endless track assembly which is designed to incorporate the advantages of all the above-mentioned constructions.

More specifically, the invention provides an endless track assembly including a plurality of spaced and transversely extending traction bars or cleats and three endless belts formed from a flexible material and secured to the traction bars for movement in paralled spaced relation with only the center belt having at least one row of longitudinally spaced teeth projecting from the inner surface thereof.

In accordance with a preferred embodiment of the invention, the center belt is a one-piece unit and the outer two belts are of a spliced construction.

Also, in accordance with the invention, there is provided an endless track assembly including three endless belts formed from a flexible material and mounted on spaced and transversely extending traction bars cleats for movement in parallel spaced relation together with a drive sprocket having circumferentially spaced and axially extending drive lugs arranged to drivingly engage drive teeth projecting from the inner surface of only the center belt.

In accordance with one embodiment of the invention, the traction bars are spaced apart at intervals corresponding to the circumferential spacing between two or more of the drive lugs on the drive sprocket.

A primary feature of the invention is the provision of a low cost, mechanically efficient, endless track assembly for tracked vehicles such as snowmobiles, tractors, and the like.

Another principal feature of the invention is the provision of an endless track assembly and driving arrangement therefor which affords a mechanically efficient operation of the track assembly particularly at high speed operations.

A further principal feature of the invention is the provision of an endless track assembly including a plurality of transversely extending traction bars and three endless flexible belts formed from a flexible material and secured to the traction bars for movement in parallel spaced relation with only the center belt including at least one row of longitudinally spaced drive teeth projecting from the inner surface thereof.

Other features and advantages of the invention will become apparent upon reviewing the following detailed description of the drawings and the appended claim.

Figure 1:
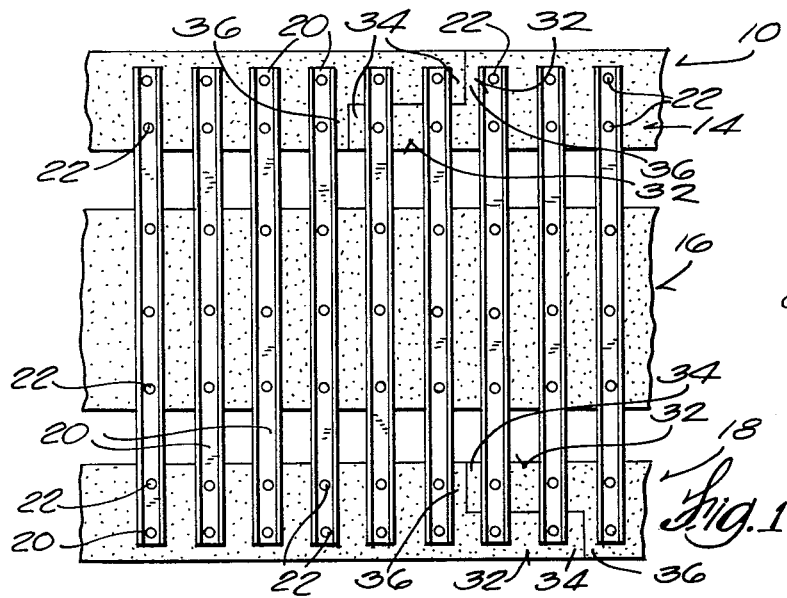
FIG. 1 is a fragmentary plan view of an endless track assembly incorporating various of the features of the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in FIGS. 1 through 5 is an endless track assembly 10 mounted on a drive sprocket 12 which is operatively connected, via a drive shaft 13, to a power source (not shown), such as an engine or transmission of a vehicle. While only the drive sprocket 12 is shown, it should be understood that the endless track assembly 10 is also trained over idler wheels or sprockets which hold the track assembly in fairly tight engagement with the drive sprocket 12.

The endless track assembly 10 includes three endless belts 14, 16, and 18, which are formed from a flexible material and are connected for coplanar movement by spaced and transversely extending traction bars or cleats 20. As used herein the term endless belts means either a one-piece endless band or belt or a strip of material spliced together to form an endless band or belt. The traction bars 20 have a generally U-shaped cross-section and are longitudinally spaced in parallel relation at uniform intervals along the belts 14, 16, and 18. Each traction bar 20 is secured to the outer surfaces of the belts 14, 16, and 18 by rivets 22.

In order to maximize the mechanical efficiency and minimize fabrication costs of the track assembly 10, only the center belt 16 is provided with at least one row of drive teeth 24 which project from the generally flat inner surface 30 of the center belt 16 and are longitudinally spaced at uniform intervals along the belt 16. In the specific construction illustrated in FIGS. 1 through 5, the center belt 16 is provided with a pair of laterally spaced, parallel rows 26 and 28 of drive teeth 24.

The center belt 16 and the drive teeth 24 can be arranged in various manners; for instance, as shown in the Irgens U.S. Pat. No. 3,472,563, issued Oct. 14, 1969, which patent is incorporated herein by reference.

In the embodiment illustrated in FIGS. 1 through 5, the center belt 16 is arranged in generally the same manner as the construction illustrated in FIGS. 1 through 4, of the above-identified Irgens Patent. More specifically, the drive teeth 24 of row 26 are staggered with respect to the drive teeth 24 of row 28 with the teeth in the tow 26 being generally aligned with a spacing between the drive teeth 24 of the row 28 and vice-versa. The center belt 16 is preferably a one-piece unit and can be manufactured by molding of an elastomeric material, such as a reinforced rubber.

Each of the outer two belts 14 and 18 is fabricated from a flexible material, such as rubber. While the outer belts 14 and 18 can be one-piece units, each preferably is formed from a strip of flexible material which is spliced together to form an endless belt so as to minimize the fabrication costs of the track assembly 10. The ends 32 of the outer two belts 14 and 18 are cut in a generally S-shape and are held together in substantially abutting relation by a number of the traction bars 20. In the preferred construction illustrated in FIG. 1, each end 32 of the belts 14 and 18 include a rectangular extension 34 and a rectangular off-set portion or notch 36 with the extension 34 on one end 32 fitting into an abutting relation within the notch 36 on the other end 32 and vice-versa. Each end extension 34 is attached to a pair of adjacent traction bars 20 by the rivets 22 located on each side of the adjacently located ends 32 of the belts 14 and 18.

As mentioned above, the track assembly 10 is driven by a drive sprocket 12 having a plurality of drive lugs 40 which drivingly engage the drive teeth 24. The drive sprocket 12 includes a central disc 42 extending radially from a hub 44 having a central bore 46 which receives the drive shaft 13. The drive lugs 40 extend oppositely and axially from the outer periphery of the disc 42 and are circumferentially spaced at equal intervals to alternately engage the drive teeth 24 of the rows 26 and 28 on the center belt 16 upon rotation of the drive sprocket 12. In order to provide smooth engagement of the drive lugs 40 with the drive teeth 24, the outer surface of the drive lugs 40 preferably is curved.

While more than one drive sprocket can be used and the center belt 16 provided with the additional rows of drive teeth 24 to accommodate the additional drive sprocket or sprockets, a single drive sprocket is preferred in order to reduce the overall cost of the track assembly and the driving arrangment therefor.

Various means can be used to support the outer two belts 14 and 18. In the specific construction illustrated, each of the belts 14 and 18 is supported by wheels 50 which are mounted to rotate freely on the drive shaft 13.

The center belt 16 is made wide enough to minimize the overall stretch of the track assembly 10 under operating conditions and yet is as narrow as possible in order to minimize cost. For example, when the track assembly 10 is used on a snowmobile, the center belt 16 can be about 6 inches wide. While the outer two belts 14 and 18 can have a width about the same as that for the center belt 16, the outer belts 14 and 18 preferably have a somewhat smaller width, e.g., about 3½ inches, and the spacing between each of the outer belts 14 and 18 and the center belt 16 is considerably larger than that for conventional three-band, cleated track assemblies, e.g., a spacing of about 3¾ inches versus a typical spacing of about 1¼ inch. When narrow outer belts are used, track assemblies of various widths can be produced with the same belting by simply using traction bars of the desired length and adjusting the spacing between the belts to provide the desired overall width. Thus, the inventories of different sized track belts can be reduced significantly.

In order to further reduce costs of fabrication and weight of the track assembly 10, the traction bars 10 can be spaced apart 2 or more pitches, e.g., the spacing between adjacent traction bars 20 generally corresponds to the circumferential spacing between two or more drive sprockets lugs 40, rather than being spaced one pitch apart which is the usual practice in conventional cleated track assembly constructions. In the construction illustrated in FIG. 3, the spacing between the traction bars 20 corresponds to the circumferential spacing between every other of the drive sprocket lugs 40.

Figure 3:
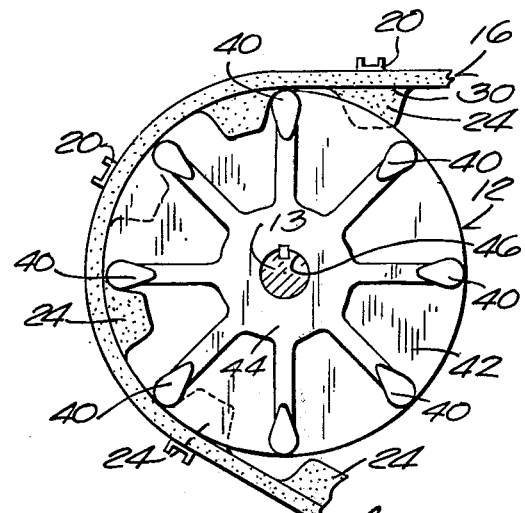
FIG. 3 is a sectional view taken generally along line 3—3 in FIG. 2 and showing an alternate spacing of the traction bars.
Figure 5:
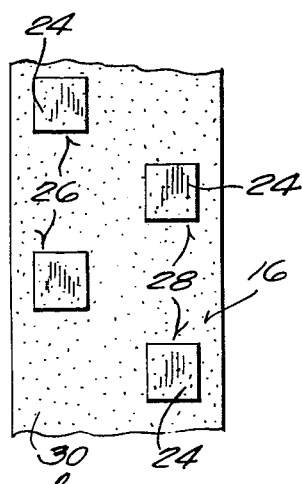
FIG. 5 is a fragmentary plan view of the inner side of the center belt of the track assembly shown in FIG. 1.
Figure 4:
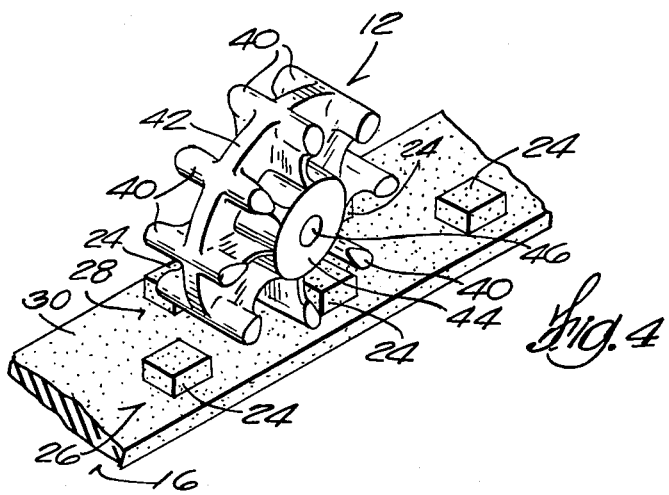
FIG. 4 is a perspective view of the drive sprocket and the center belt of the track shown in FIG. 3.

The drive teeth 24 are relatively inflexible and the portions of the belts on which the traction bars 20 are mounted tend to be relatively inflexible. Therefore, in order to avoid making other parts of the belts inflexible, each traction bar 20 preferably is located directly over a drive tooth 24 and is generally centered on the center line of the drive tooth as shown in FIG. 3.

Figure 6:
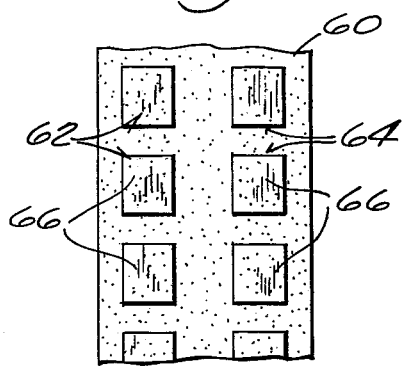
FIG. 6 is a fragmentary plan view of an alternate construction of the center belt of the track assembly.
Figure 2:
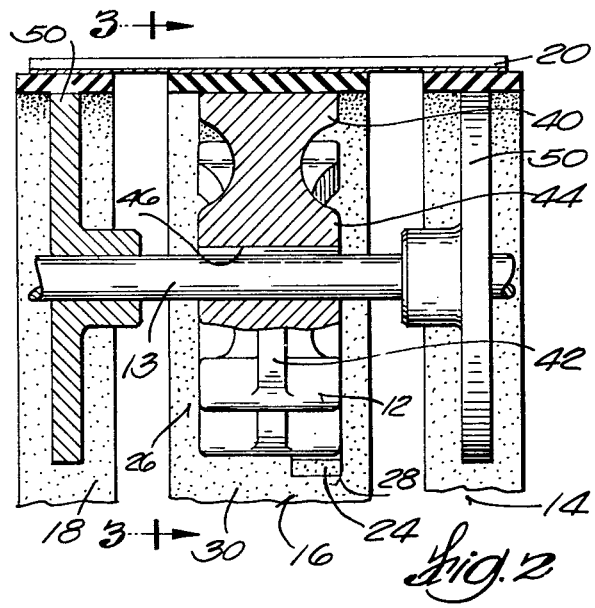
FIG. 2 is a fragmentary, end elevational view, partially cross-sectioned, of the endless track assembly of FIG. 1, shown mounted on a drive sprocket.

In the alternate construction shown in FIG. 6, the center belt 60 includes a pair of laterally spaced, parallel rows 62 and 64 of longitudinally spaced drive teeth 66 which, instead of being staggered as in the construction shown in FIGS. 1 through 5, are parallel or laterally aligned. With this arrangement, the disc portion 42 of the drive sprocket 12 rides between the rows 62 and 64 and the drive teeth 66 are simultaneously engaged by the opposite end portions of a drive lug 40 during rotation of drive sprocket 12.

Various features of the invention are set forth in the following claims:

I claim:

1. An endless track assembly including a plurality of spaced and transversely extending traction bars, and three endless flexible belts secured to said traction bars for movement in parallel spaced relation, only the center one of said belts including one row of longitudinally spaced drive teeth projecting from the inner surface thereof.

2. An endless track assembly according to claim 1 wherein said center belt is a one-piece unit.

3. An endless track according to claim 1 wherein each of the outer two of said belts are of spliced construction and include adjacently located substantially abutting ends.

4. An endless track assembly according to claim 3, wherein said abutting ends of said outer belts are generally S-shaped.

5. An endless track assembly according to claim 1 wherein said center belt includes a pair of laterally spaced rows of said drive teeth and said drive teeth are evenly spaced with said drive teeth in one row being staggered with respect to all of said drive teeth in the other of said rows.

6. An endless track assembly according to claim 1 wherein each of said traction bars is located directly over one of said drive teeth.

7. An endless track assembly according to claim 1 wherein said center belt includes a pair of laterally spaced parallel rows of said drive teeth and said drive teeth are evenly spaced with said drive teeth in one row being parallel to all of said drive teeth in the other of said rows.

8. An endless track assembly according to claim 1 wherein said center belt is substantially wider than the outer two of said belts.

9. The combination of a drive sprocket having a radially extending disc and a series of circumferentially spaced, axially extending lugs extending from both sides of said disc adjacent to the periphery thereof, and an endless track assembly having a plurality of parallel spaced and transversely extending traction bars and three endless flexible belts secured to said traction bars for movement in parallel spaced relation, only the center one of said belts having at least one row of longitudinally spaced drive teeth projecting from the inner surface thereof, said track assembly being trained about said drive sprocket with at least some of said center belt drive teeth being received between said drive sprocket lugs.

10. A combination according to claim 9 wherein the longitudinal spacing between said traction bars generally correspnds to the circumferential spacing between two or more of said drive sprocket lugs.

11. An endless track assembly comprising a plurality of spaced and transversely extending traction bars and three endless flexible belts secured to said traction bars, only the center of said belts being a one-piece unit and having a pair of laterally spaced parallel rows of longitudinally spaced drive teeth projecting from the inner surface thereof, and each of the outer two of said belts being of a spliced construction and having adjacently located substantially abutting ends.

12. An endless track assembly according to claim 11 wherein said center belt is substantially wider than the outer two of said belts.

13. An endless track assembly according to claim 11 wherein each of said traction bars is located directly over one of said drive teeth.

* * * * *